United States Patent
Hou et al.

(10) Patent No.: US 9,051,396 B2
(45) Date of Patent: Jun. 9, 2015

(54) PARTIALLY HYDROGENATED POLYMER AND METHOD THEREOF

(75) Inventors: Hung Chieh Hou, Pingtung (TW); Man-Yin Lo, Zhubei (TW)

(73) Assignee: TSRC Corporation, Taipei, Taiwan (CN)

( * ) Notice: Subject to any disclaimer, the term of this patent is extended or adjusted under 35 U.S.C. 154(b) by 278 days.

(21) Appl. No.: 12/870,467

(22) Filed: Aug. 27, 2010

(65) Prior Publication Data

US 2011/0098412 A1 Apr. 28, 2011

Related U.S. Application Data

(60) Provisional application No. 61/237,999, filed on Aug. 28, 2009.

(51) Int. Cl.
| | | |
|---|---|---|
| C08F 212/32 | (2006.01) | |
| C08F 8/04 | (2006.01) | |
| C08F 297/04 | (2006.01) | |

(52) U.S. Cl.
CPC ............. *C08F 8/04* (2013.01); *C08F 297/04* (2013.01)

(58) Field of Classification Search
CPC ........ C08F 8/03; C08F 212/32; C08F 236/10; C08F 112/06; C08F 112/32
USPC ......................................... 525/338, 339, 314
See application file for complete search history.

(56) References Cited

U.S. PATENT DOCUMENTS

| | | | |
|---|---|---|---|
| 5,178,926 A | 1/1993 | Tanaka et al. | |
| 5,352,744 A | 10/1994 | Bates et al. | |
| 6,350,820 B1 * | 2/2002 | Hahnfeld et al. | .......... 525/332.9 |
| 6,841,626 B1 | 1/2005 | Wege et al. | |
| 2006/0211827 A1 * | 9/2006 | Rempel et al. | .............. 525/329.1 |

FOREIGN PATENT DOCUMENTS

| | | | |
|---|---|---|---|
| DE | 2033779 | 1/1972 | |
| EP | 317263 A2 * | 5/1989 | ............... C08F 8/04 |
| JP | 05-097916 A | 4/1993 | |
| JP | 2002-082202 | 3/2002 | |

OTHER PUBLICATIONS

Machine Translation of JP 2002-082202.*
Machine Translation of DE 20 33 779.*
Full English Translation of JP 2002-082202.*
(Continued)

*Primary Examiner* — Mark Kaucher
(74) *Attorney, Agent, or Firm* — Snell & Wilmer L.L.P.

(57) ABSTRACT

The present invention discloses a method for partially hydrogenating polymer. The method comprises providing a polymer having at least one vinyl aromatic block; and hydrogenating the polymer in presence of a heterogeneous catalyst on a support selected from the group consisting of $BaSO_4$, $Al_2O_3$, $TiO_2$, $ZrO_2$, active carbon and any combination thereof to obtain a hydrogenated polymer. The hydrogenated polymer comprises at least one hydrogenated vinyl aromatic block having a carbon ring linking with a backbone of the hydrogenated polymer, wherein the average weight percent of the hydrogenated vinyl aromatic block(s) having only one and two double bonds on the carbon ring is between 1-30 wt % based on the total weight of the hydrogenated polymer.

9 Claims, 9 Drawing Sheets

(56) References Cited

OTHER PUBLICATIONS

European Search Report from corresponding Application No. 10174519.8 dated Oct. 28, 2010.
Chang, Jen-Ray et al., Pd/Al2O3 Catalysts for Selective Hydrogenation of Polystyrene-block-polybutadiene-block-polystyrene Thermoplastic Elastomers, Ind. Eng. Chem. Res., 1998, vol. 37, No. 4, pp. 1220-1227, 1998 American Chemical Society, published on web.
Office Action mailed May 28, 2013 in counterpart Japanese Application No. 2010-192164.
Office Action mailed Jun. 13, 2013 in counterpart Taiwanese Application No. 10-220759460.

* cited by examiner

PARTIALLY HYDROGENATED POLYMER AND METHOD THEREOF

RELATED APPLICATION

This application claims the right of priority based on U.S. Provisional Application No. 61/237,999, entitled "METHOD FOR SELECTIVELY HYDROGENATING BLOCK COPOLYMER AND COMPOSITION THEREOF," filed on Aug. 28, 2009, which is incorporated herein by reference and assigned to the assignee herein.

FIELD OF INVENTION

The present invention relates to partially hydrogenating unsaturated polymer, more particularly to the unsaturated polymers containing vinyl aromatic groups under the condition of heterogeneous catalyst.

BACKGROUND OF THE INVENTION

Polymers containing conjugated diene and vinyl aromatic groups, such as tri-block or penta-block copolymer of styrene-butadiene or styrene-isoprene, have already been commercialized in many applications; for example, the polymers have been used as adhesives, soles, and polymer improvers. However, the conjugated diene group and vinyl aromatic group are prone to cracking due to heat or oxidation, exposure to ultra-violet light, or other unfavorable environment, and thus become unstable.

Substantially saturating the polymers by hydrogenation may improve the stability of the polymers, which are broadly used in flexible materials, biomedical material, etc. There are many patents involved in this technology, such as U.S. Pat. No. 5,352,744 which discloses a completely hydrogenated polymer having a saturation degree higher than 99.5% for aromatic/polydiene groups. U.S. Pat. No. 6,841,626 also discloses a hydrogenated polymer with a saturation degree of polystyrene group in 98.4%.

However, currently the partial saturation technology provides polymers with saturation degrees of aromatic groups either too high or too low. The saturation degree higher than 90% is unflavored due to the loss of chain flexibility. The saturation degree lower than 20% is also undesired due to the insufficient stability. Therefore, there is a need to provide a new partially hydrogenated polymer with an appropriate saturation degree to fit the application requirements.

SUMMARY OF THE INVENTION

One aspect of the present invention is to provide a partially hydrogenated polymer with an appropriate saturation degree, i.e. the appropriate amount of double bond on the aromatic block.

In one embodiment, the present invention provides a hydrogenated polymer, comprising at least one hydrogenated conjugated diene block; and at least one hydrogenated vinyl aromatic block having a carbon ring linking with a backbone of the hydrogenated polymer, wherein the average weight percent of the hydrogenated vinyl aromatic block(s) having only one and two double bonds on the carbon ring is between 1-30 wt %, preferably between 2-20 wt % based on the total weight of the hydrogenated polymer.

Another aspect of the present invention is to partially hydrogenate the conjugated diene block and the aromatic block of the polymers using heterogeneous catalyst. More particularly, the hydrogenation level of conjugated diene polymer block is greater than 95% while the aromatic group is converted to a moiety such as cyclohexene, cyclohexane or cyclohexadiene via partial hydrogenation. For avoiding the undesired properties as aforementioned, the hydrogenation level of the aromatic block is between 20%~90%, more preferably between 25%~80%, and more preferably between 30%~60%. That is to keep an appropriate amount of double bond on the carbon ring, so as to facilitate the following functionalization reactions or partial crosslinking reactions In another embodiment, the present invention provides a hydrogenated polymer, consisting essentially of at least one hydrogenated vinyl aromatic block having a carbon ring linking with a backbone of the hydrogenated polymer. That is, the hydrogenated polymer is in absence of hydrogenated conjugated diene block. The average weight percent of the hydrogenated vinyl aromatic block(s) having only one and two double bonds on the carbon ring is between 1-30 wt %, preferably between 2-20 wt %, most preferably between 2-15 wt % based on the total weight of the hydrogenated polymer.

Another aspect of the present invention is to partially hydrogenate the aromatic block of the polymer in absence of conjugated diene using heterogeneous catalyst. More particularly, the aromatic group is converted to a moiety such as cyclohexene, cyclohexane or cyclohexadiene via partial hydrogenation. For avoiding from the undesired properties as aforementioned, the hydrogenation level of the aromatic block is between 20%~90%, more preferably between 25%~80%, and more preferably between 30%~60%. That is, the hydrogenation level of the aromatic group is optimized to keep an appropriate amount of double bonds on the carbon ring, so as to facilitate the following functionalization reactions or partial crosslinking reactions.

The invention still includes other aspects to resolve other problems, some of which will be described in detail together with the abovementioned aspects in the following detail description.

DETAILED DESCRIPTION OF THE INVENTION

The preferred embodiments of the present invention will now be described in greater detail by referring to the drawings that accompany the present application. Descriptions of well-known components, materials, and process techniques are omitted so as to not unnecessarily obscure the embodiments of the invention.

The First Hydrogenated Polymer

Figure 1:
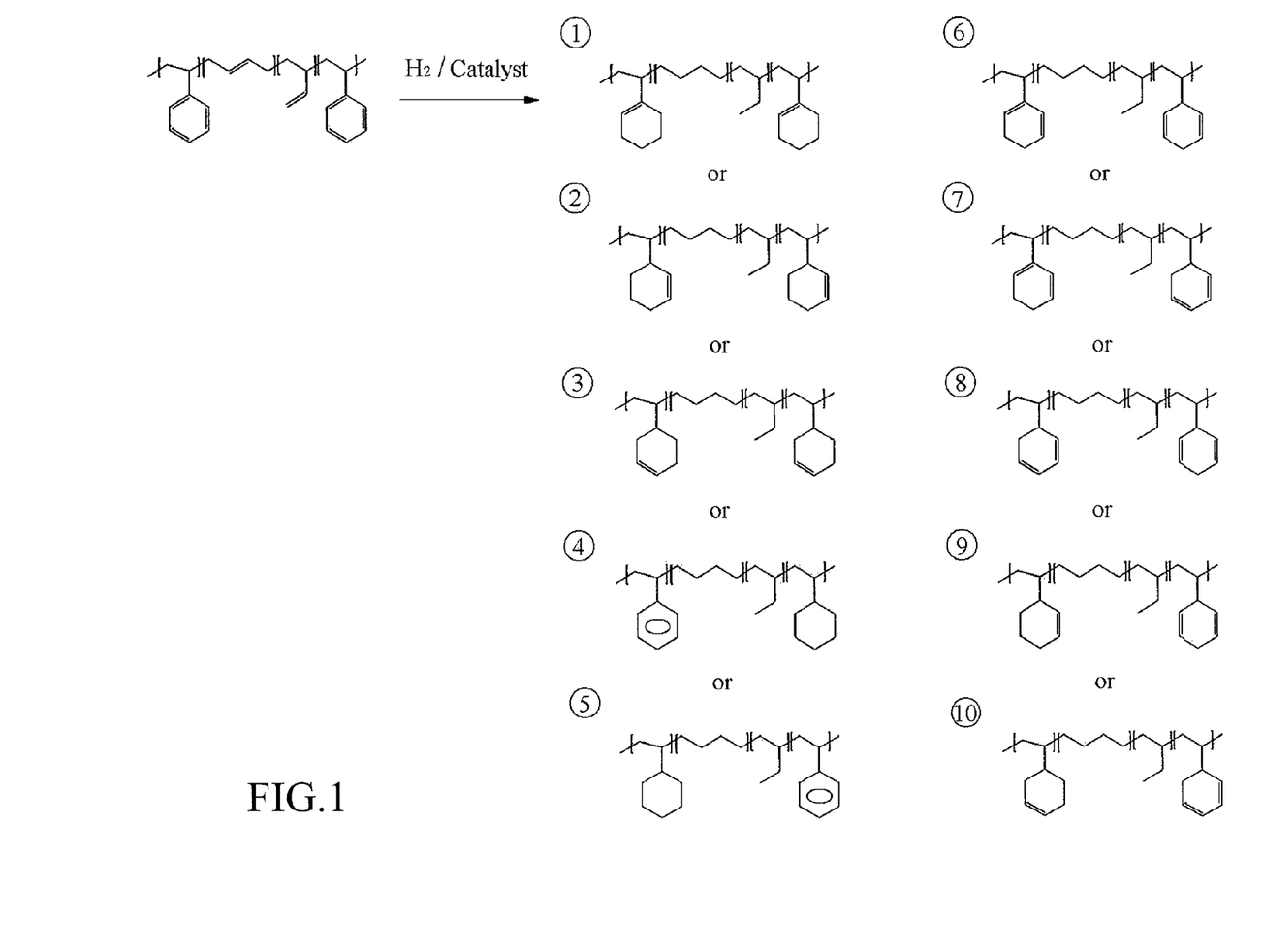
FIG. 1 shows some exemplary embodiments of the first hydrogenated polymers in accordance with the present invention.

The hydrogenated polymers of the present invention can be classified into two classes. The first class is a first hydrogenated polymer including at least one hydrogenated vinyl aromatic block and at least one hydrogenated conjugated diene block. The total weight average molecular weight (Mw) of the first hydrogenated polymer is from 5,000 to 400,000, more preferably from 5,000 to 200,000, most preferably from 20,000 to 100,000. The total weight average molecular weight (Mw) is determined by gel permeation chromatography (GPC) that is familiar to the skilled person in the art. The first hydrogenated polymer is characterized in that the average weight percent of the hydrogenated vinyl aromatic block(s) having only one and two double bonds on the carbon ring is between 1-30 wt %, preferably between 2-20 wt % based on the total weight of the first hydrogenated polymer, which is determined using nuclear magnetic resonance apparatus (NMR). This average weight percent for determining the amount of one double bond and two double bonds on the aromatic block can be referred as DB % herein and after. The DB % determination method is described in the following paragraphs. The first hydrogenated polymer is further characterised in that the average hydrogenation level for the hydrogenated vinyl aromatic block is between 20 percent and 90 percent, preferably between 25 percent and 80 percent; and more preferably between 30 percent and 60 percent; and the average hydrogenation level for the hydrogenated conjugated diene block is greater than 95 percent. The average hydrogenation level is determined using UV-VIS spectroscopy that is familiar to the skilled person in the art. The chemical structure of the first hydrogenated polymer is depicted as below, but not limited thereto:

FIG. 1 also shows some exemplary embodiments of the first hydrogenated polymers in accordance with the present invention. The first hydrogenated polymer includes from 5 to 95 weight percent hydrogenated vinyl aromatic polymer and 5 to 95 weight percent hydrogenated conjugated diene polymer, based on the total weight of the hydrogenated block copolymer. In one embodiment, the vinyl aromatic monomer is styrene and the conjugated diene monomer is butadiene or isoprene. In one embodiment, the hydrogenated polybutadiene is obtained from the hydrogenation of a polybutadiene. In one embodiment, the hydrogenated conjugated diene polymer is hydrogenated polyisoprene. Note that the monomers of the present invention are not limited to styrene, butadiene and isoprene. Any suitable derivatives thereof can be used in the present invention. For example, a monomer of the hydrogenated vinyl aromatic block can be independently selected from the group consisting of styrene, all isomers of methylstyrene, all isomers of ethylstyrene, cyclohexylstyrene, vinyl biphenyl, 1-vinyl-5-hexyl naphthalene, vinyl naphthalene, vinyl anthracene, and any combination thereof. A monomer of the hydrogenated conjugated diene block can be independently selected from the group consisting of 1,3-butadiene, 2,3-dimethyl-1,3-butadiene, 3-butyl-1,3-octadiene, isoprene, 1-methylbutadiene, 2-phenyl-1,3-butadiene, and any combination thereof.

The Second Hydrogenated Polymer

The second class is a second hydrogenated polymer essentially consisting of at least one hydrogenated vinyl aromatic block. That is, the second hydrogenated polymer is in absence of hydrogenated conjugated diene block. The total weight average molecular weight (Mw) of the second hydrogenated polymer is from 5,000 to 150,000, more preferably from 5,000 to 100,000. The total weight average molecular weight (Mw) is determined by gel permeation chromatography (GPC) that is familiar to the skilled person in the art. The second hydrogenated polymer is characterized in that the average weight percent (DB %) of the hydrogenated vinyl aromatic block(s) having only one and two double bonds on the carbon ring is preferably between 1-30 wt %, more preferably between 2-20 wt %, most preferably between 2-15 wt % based on the total weight of the second hydrogenated polymer, which is determined using nuclear magnetic resonance apparatus (NMR). The DB % determination method is described in the following paragraphs. The second hydrogenated polymer is further characterised in that the average hydrogenation level for the hydrogenated vinyl aromatic block is between 20 percent and 90 percent, preferably between 25 percent and 80 percent; and more preferably between 30 percent and 60 percent. The average hydrogenation level is determined using UV-VIS spectroscopy that is familiar to the skilled person in the art.

In one embodiment, the vinyl aromatic monomer is styrene. Note that the monomers of the present invention are not limited to styrene. Any suitable derivatives thereof can be used in the present invention. For example, a monomer of the hydrogenated vinyl aromatic block can be independently selected from the group consisting of styrene, all isomers of methylstyrene, all isomers of ethylstyrene, cyclohexylstyrene, vinyl biphenyl, 1-vinyl-5-hexyl naphthalene, vinyl naphthalene, vinyl anthracene, and any combination thereof.

Process for Manufacturing the First Hydrogenated Polymer

Figure 2:
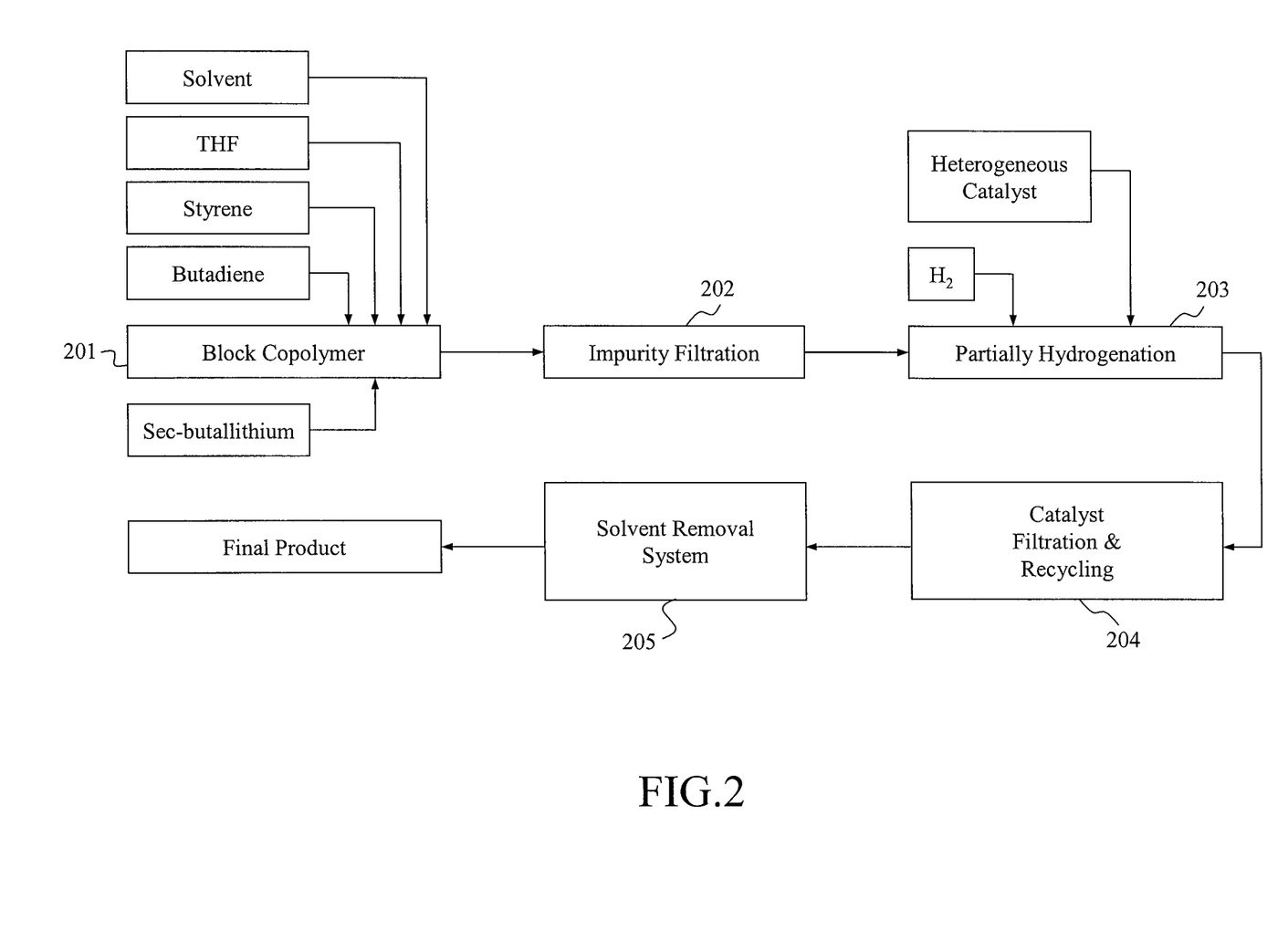
FIG. 2 shows a process for manufacturing the first hydrogenated polymer in accordance with an embodiment of the present invention.

FIG. 2 shows a process for manufacturing the first hydrogenated polymer in accordance with an embodiment of the present invention. In this embodiment, the process is performed by way of Steps 201-205, but not limited thereto. Step 201 is to form block copolymer through polymerization. Step 202 is to remove impurities. Step 203 is to partially hydrogenate the block copolymer. Step 204 is to recover the catalyst for reuse. Step 205 is to remove the solvent. Please note that the detail descriptions here are recited for exemplary purpose only rather than limitation. For example, the present invention does not require the specific order to perform the process. Step 201, a polymerization initiator, such as an organolithium compound, is used to form a block copolymer. After the polymerization, Step 202 is performed in which the organolithium compound is optionally filtered. In some embodiments, the block copolymer has a weight average molecular weight between 5,000 and 400,000, more preferably between 5,000 and 200,000, and most preferably between 20,000 to 100,000. In one embodiment, the block copolymer is a tri-block copolymer of vinyl aromatic polymer block-conjugated diene polymer block-vinyl aromatic polymer block. In another embodiment, the block copolymer is a pentablock copolymer of vinyl aromatic polymer block-conjugated diene polymer block-vinyl aromatic polymer block-conjugated diene polymer block-vinyl aromatic polymer block. In one embodiment, the weight ratio of the vinyl aromatic polymer block to the conjugated diene polymer block in the block copolymer is from about 5:95 to about 95:5, preferably from about 10:90 to about 90:10.

Then, in Step 203, the block copolymer of a vinyl aromatic polymer block and a conjugated diene polymer block is hydrogenated by contacting with a hydrogenating agent, such as hydrogen gas, in the presence of a hydrogenation catalyst to obtain a polymer solution including a partially hydrogenated block copolymer having a hydrogenation level of greater than 20 percent and less than 90 percent. The hydrogenation catalyst includes an element from Group VIII transition metal of the periodic table, and is preferably selected from a group consisting of a palladium, ruthenium, and nickel. The hydrogenation catalyst support includes $BaSO_4$, $Al_2O_3$, $TiO_2$, $ZrO_2$, active carbon, and any combination thereof. Additionally, it should be noted that the hydrogenation catalyst support is preferably with pore sizes only distributed less than 500 angstrom because the pore sizes greater than 500 angstrom tends to raise the hydrogenation level due to the increased contact surface area. The pore size distribution is measured using gas adsorption/desorption isotherm that is familiar to the skilled person in the art. Then, Step 204 of this embodiment is performed to filter the catalyst from the polymer solution. Following that, an antioxidant, such as hindered phenolic antioxidant, is added into the polymer solution.

Then Step 205 is performed in which the solvent is removed from the polymer solution by a flash devolatilization at a temperature of 200° C. to 300° C. and a pressure of 1 to 10 Bar(s) to obtain a concentrated polymer solution with a residual solvent in an amount of 1 to 50 weight percent based on the total weight of the concentrated polymer solution. The residual solvent is removed from the concentrated polymer solution by a devolatilizer at a pressure below 100 torr to isolate the hydrogenated block copolymer, and more preferably below 10 torr. The devolatilizer may be a twin-screw extruder or a film evaporator. In this embodiment, the concentrated polymer solution is performed by a twin-screw extruder at a temperature of 200° C. to 300° C.

Process for Manufacturing the Second Hydrogenated Polymer

Figure 3:
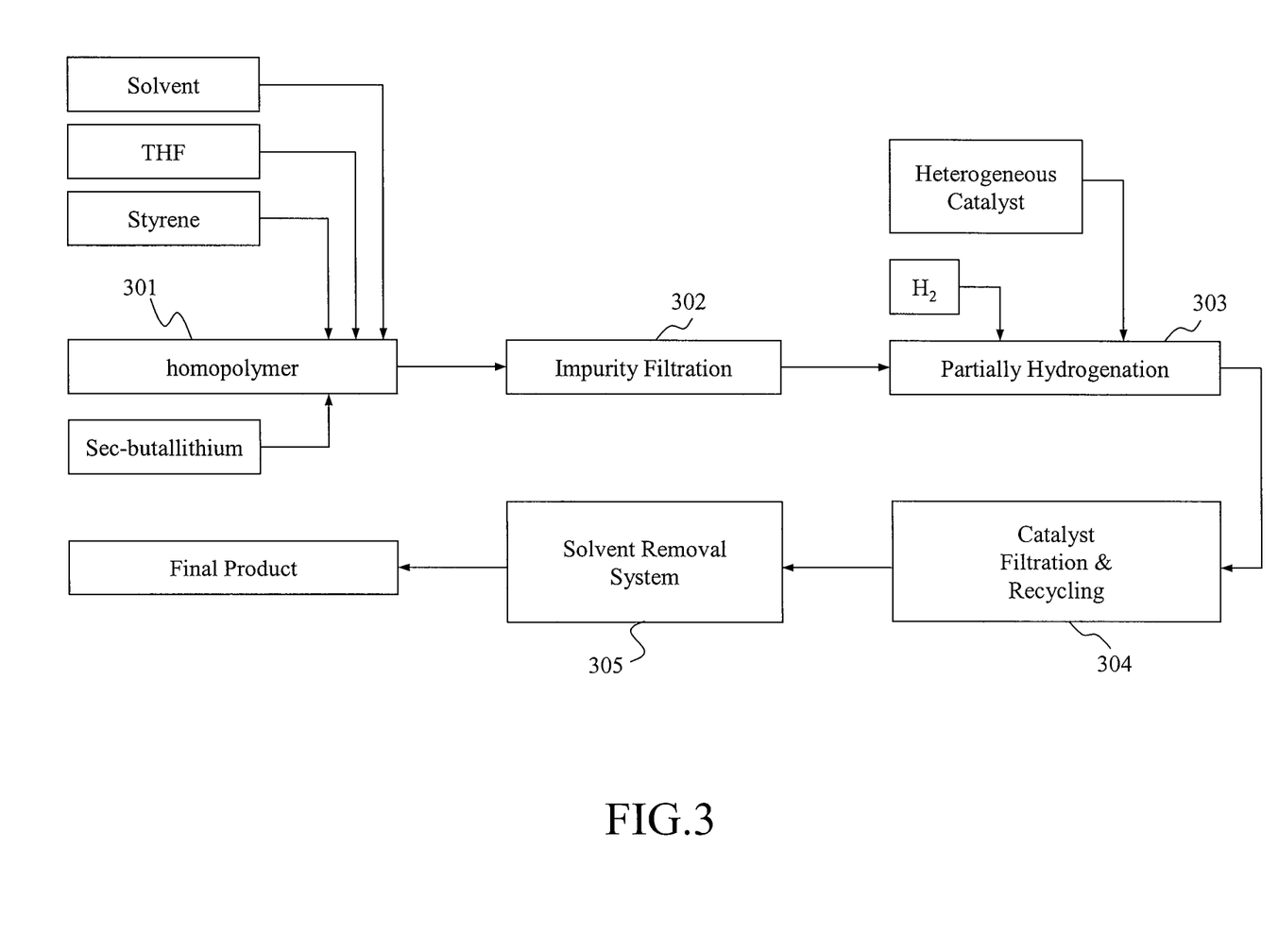
FIG. 3 shows a process for manufacturing the second hydrogenated polymer in accordance with an embodiment of the present invention.

FIG. 3 shows a process for manufacturing the second hydrogenated polymer in accordance with an embodiment of the present invention. In this embodiment, the process is performed by way of Steps 301-305, but not limited thereto. Step 301 is to form a polymer through polymerization. Step 302 is to remove impurities. Step 303 is to partially hydrogenate the polymer. Step 304 is to recover the catalyst for reuse. Step 305 is to remove the solvent. Please note that the detail descriptions here are recited for exemplary purpose only rather than limitation. For example, the present invention does not require the specific order to perform the process. In Step 301, a polymerization initiator, such as an organolithium compound, is used to form a vinyl aromatic polymer. After the polymerization, Step 302 is performed in which the organolithium compound is optionally filtered. In some embodiments, the vinyl aromatic polymer has a weight average molecular weight between 5,000 and 150,000, and more preferably between 5,000 and 100,000.

Then, in Step 303, the vinyl aromatic polymer is hydrogenated by contacting with a hydrogenating agent, such as hydrogen gas, in the presence of a hydrogenation catalyst to obtain a polymer solution including a partially hydrogenated block having a hydrogenation level of greater than 20 percent and less than 90 percent. The hydrogenation catalyst includes an element from Group VIII transition metal of the periodic table, and is preferably selected from a group consisting of a palladium, ruthenium, and nickel. The hydrogenation catalyst support includes $BaSO_4$, $Al_2O_3$, $TiO_2$, $ZrO_2$, active carbon and any combination thereof. Additionally, it should be noted that the hydrogenation catalyst support is preferably with pore sizes only distributed less than 500 angstrom because the pore sizes greater than 500 angstrom tends to raise the hydrogenation level due to the increased contact surface area. The pore size distribution is measured using gas adsorption/desorption isotherm that is familiar to the skilled person in the art. Then, Step 304 of this embodiment is performed to filter the catalyst from the polymer solution. Following that, an antioxidant, such as hindered phenolic antioxidant, is added into the polymer solution.

Then Step 305 is performed in which the solvent is removed from the polymer solution by a flash devolatilization at a temperature of 200° C. to 300° C. and a pressure of 1 to 10 Bar(s) to obtain a concentrated polymer solution with a residual solvent in an amount of 1 to 50 weight percent based on the total weight of the concentrated polymer solution. The residual solvent is removed from the concentrated polymer solution by a devolatilizer at a pressure below 100 torr to isolate the hydrogenated polymer, and more preferably below 10 torr. The devolatilizer may be a twin-screw extruder or a film evaporator. In this embodiment, the concentrated polymer solution is performed by a twin-screw extruder at a temperature of 200° C. to 300° C.

Embodiments 1-7 show the preferred examples of making the first hydrogenated polymers.

Embodiment 1 of the Hydrogenated Tri-Block Copolymer

A. Polymerization

The process of polymerization utilizes the cyclohexane as solvent with slight tetrahydrofuran (THF) as polar modifier and sec-butyllithium as polymerization initiator. Styrene, butadiene or isoprene is used as reaction monomers. The solvent, promoter and monomer can be purified by activated alumina. The reaction is performed in an autoclave with an agitator. The reaction process is summarized as following steps:

1.1 Add 1,100 g of cyclohexane and 4 g of THF
1.2 Heat the temperature to 50° C.
1.3 Add 22.3 g of styrene
1.4 Add 5.5 g of initiator to initiate the reaction
1.5 Keep the reaction for 30 mins
1.6 Add 93.3 g of butadiene
1.7 Keep the reaction for 60 mins
1.8 Add 22.3 g of styrene
1.9 Keep the reaction for 30 mins
1.10 Add 0.2 g of methanol as terminator to terminate the reaction Thereafter, 1,245 g of solution with polystyrene-polybutadiene-polystyrene triblock copolymer having a weight average molecular weight (Mw) of 22,000 may be obtained. In this embodiment, the monomers of butadiene and styrene are added separately. In another embodiment, the monomers may add at the same time for getting random type copolymers.

B. Partially Hydrogenation 2.1 Add 200 ml of triblock copolymer solution in the autoclave (Total solid: 12%)
2.2 Add 3.0 g of Ru—$Al_2O_3$ catalyst (i.e. having 10% of Ru on the support $Al_2O_3$)
2.3 Purge with five times of Nitrogen gas and three times of Hydrogen gas
2.4 Build the pressure of Hydrogen gas to 60 kg/$cm^2$
2.5 Heat the temperature and maintain at 170° C.
2.6 Keep the reaction for 200 mins.

Embodiment 2 of the Hydrogenated Penta-Block Copolymer

A. Polymerization 1.1 Add 2320 g of cyclohexane and 6.9 g of THF
1.2 Heat the temperature to 50° C.
1.3 Add 40.95 g of styrene
1.4 Add 6.8 g of initiator to initiate the reaction
1.5 Keep the reaction for 30 mins
1.6 Add 143.3 g of butadiene
1.7 Keep the reaction for 45 mins
1.8 Add 40.95 g of styrene
1.9 Keep the reaction for 30 mins
1.10 Add 143.3 g of butadiene
1.11 Keep the reaction for 45 mins
1.12 Add 40.95 g of styrene
1.13 Keep the reaction for 30 mins
1.14 Add 0.2 g of methanol as terminator to terminate the reaction Thereafter, 2736 g of solution with polystyrene-polybutadiene-polystyrene-polybutadiene-polystyrene pentablock copolymer having a weight average molecular weight (Mw) of 65000 may be obtained.

B. Partially Hydrogenation 2.1 Add 2000 ml of pentablock copolymer solution in the autoclave (Total solid: 7%)
2.2 Add 3.5 g of Pd—C catalyst (Pd—C: Palladium on active carbon, having 10% of Palladium)
2.3 Purge with five times of Nitrogen gas and three times of Hydrogen gas
2.4 Build the pressure of Hydrogen gas to 38 kg/$cm^2$
2.5 Heat the temperature and maintain at 170° C.
2.6 Keep the reaction for 240 mins The hydrogenated block copolymers are sampled and processed by FT-IR or H-NMR to analyze its microstructure.

FT-IR Analysis (Penta-Block SBSBS Copolymer)

Figure 4:
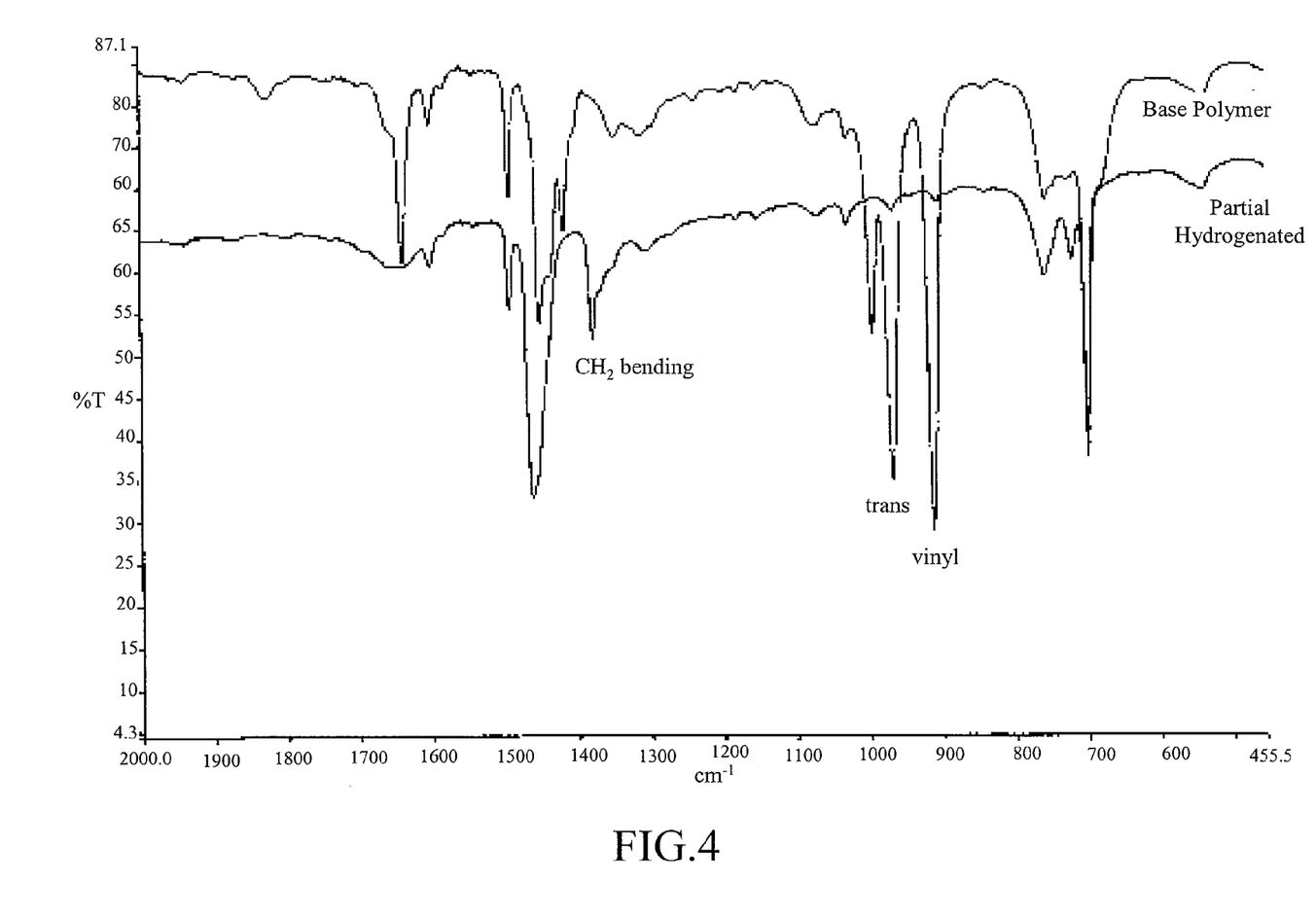
FIG. 4 shows the FT-IR spectrums of the based polymer (i.e., polymer without hydrogenation) and the hydrogenated block copolymer in accordance with an embodiment of the present invention.

FIG. 4 shows the FT-IR spectrums of the based polymer (i.e. polymer without hydrogenation) and the hydrogenated block copolymer. In comparison to the based polymer, the hydrogenated block copolymers gives a relatively unapparent adsorption band for trans- and vinyl structures, which indicates that C—C double bonds of the polybutadienes were mostly hydrogenated. A new distinct adsorption peak at about 1400 $cm^{-1}$ may represent the bending of $CH_2$ of cyclohexene.

NMR Analysis (Penta-Block SBSBS Copolymer)

Figure 5:
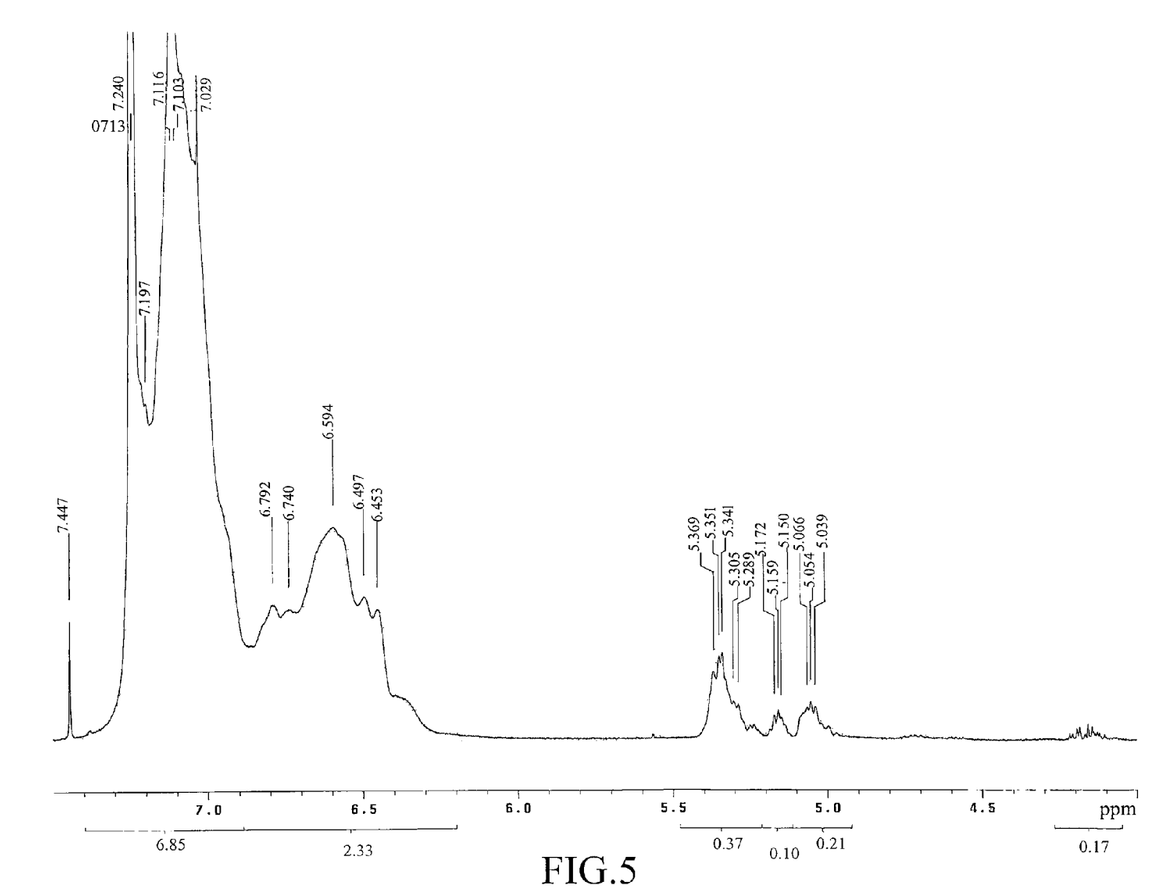
FIG. 5 shows the H-NMR spectrum of the hydrogenated block copolymer in accordance with an embodiment of the present invention.

FIG. 5 shows the H-NMR spectrum of the hydrogenated block copolymer, which indicates that most of the polybutadienes on the SBSBS pentablock copolymer are hydrogenated. In FIG. 5, certain NMR peaks at the range of 6.0 to 7.5 ppm represent the adsorption of styrene group without being hydrogenated during the hydrogenation. New distinct NMR peaks at the range of 5.0-5.5 ppm demonstrate the partial hydrogenation of the aromatic portions of the hydrogenated block copolymer. The peaks at the range of 5.0 to 5.3 ppm represent the adsorption of vinyl cyclohexadiene group (i.e., having two double bonds) generated during the hydrogenation. The peaks at the range of 5.3 to 5.5 ppm represent the adsorption of vinyl cyclohexene group (i.e., having one double bond) generated during the hydrogenation.

DB % for hydrogenated polymers referred herein is determined using nuclear magnetic resonance apparatus (NMR). The DB % determination method for Penta-Block copolymer is now described through Embodiment 2 by referring to FIG. 5. Firstly, it should be noted that in this embodiment, DB $\%_{vinyl\ cyclohexene}$ represents a ratio with only one double bond on the carbon ring, and DB $\%_{vinyl\ cyclohexadiene}$ represents a ratio with two double bonds on the carbon ring. DB % is therefore obtained from the following equation, wherein R represents the amount ratio of the styrene monomer based on the total amount of the polymer prior to hydrogenation, and S represents the amount ratio of styrene group without being hydrogenated during the hydrogenation based on the total amount of the hydrogenated polymer. Note that S is also regarded as an unhydrogenation degree of styrene group in the hydrogenated polymer, which can be obtained from the hydrogenation level determined by UV-VIS.

$$DB\% = (DB\%_{vinyl\ cyclohexene} + DB\%_{vinyl\ cyclohexadiene}) \times R,$$

DB $\%_{vinyl\ cyclohexene}$=(5/2)×S×(integral area of the vinyl cyclohexene group signals in H-NMR spectra/integral area of the signals of styrene group without being hydrogenated during the hydrogenation in H-NMR spectra)×(108/104).

DB $\%_{vinyl\ cyclohexadiene}$=(5/4)×S×(the integral area of the vinyl cyclohexadiene group signals in H-NMR spectra)/(the integral area of the signals of styrene group without being hydrogenated during the hydrogenation in H-NMR spectra)×(106/104).

The DB % determination method for the hydrogenated tri-block copolymer can be obtained in the same manner as aforementioned.

Figure 7:
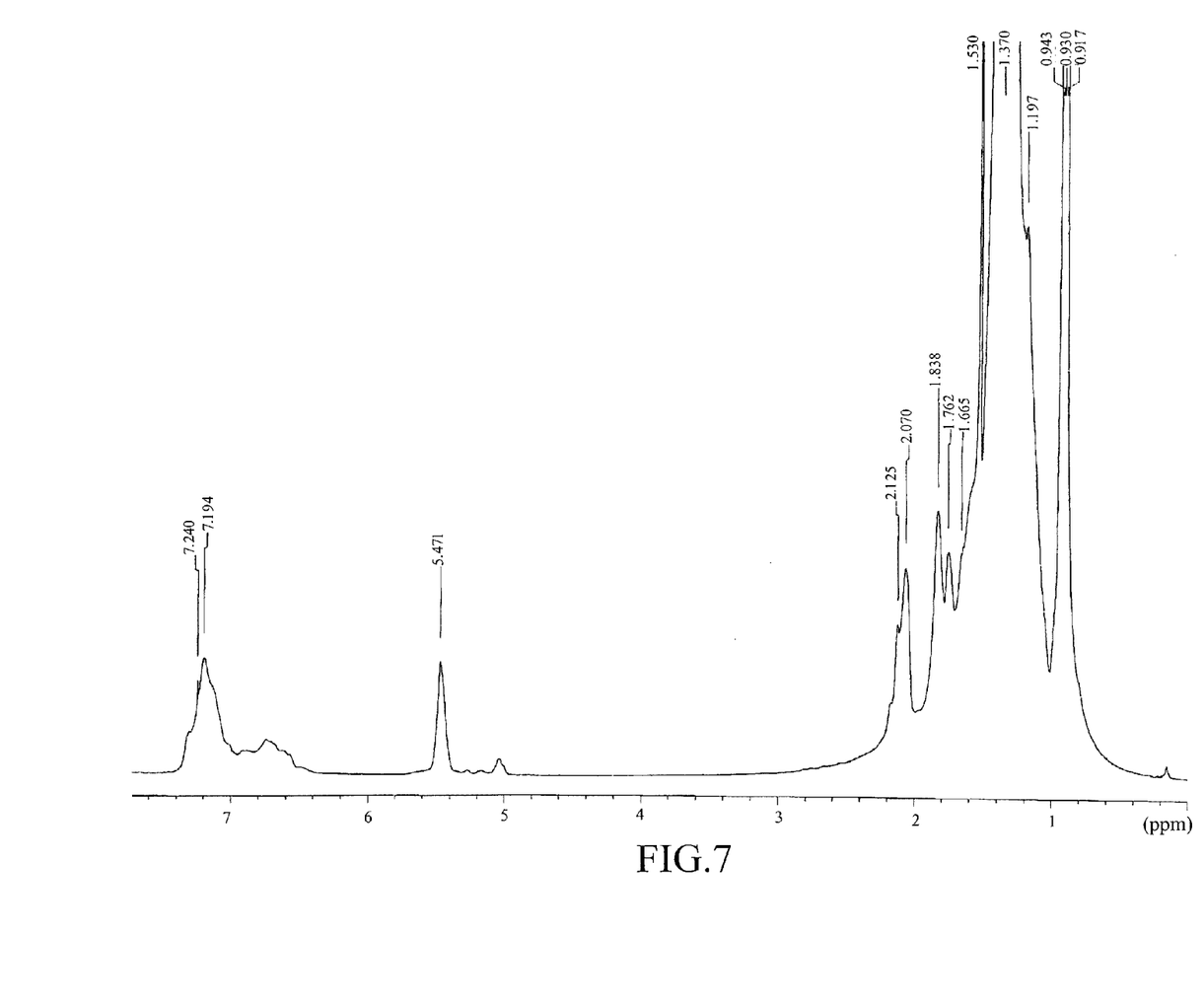
FIG. 7 shows the H-NMR spectrum of the hydrogenated tri-block copolymer in accordance with one embodiment of the present invention.

NMR analysis (Tri-Block SBS Copolymer): FIG. 7 shows the H-NMR spectrum of the hydrogenated tri-block copolymer.

Figure 8:
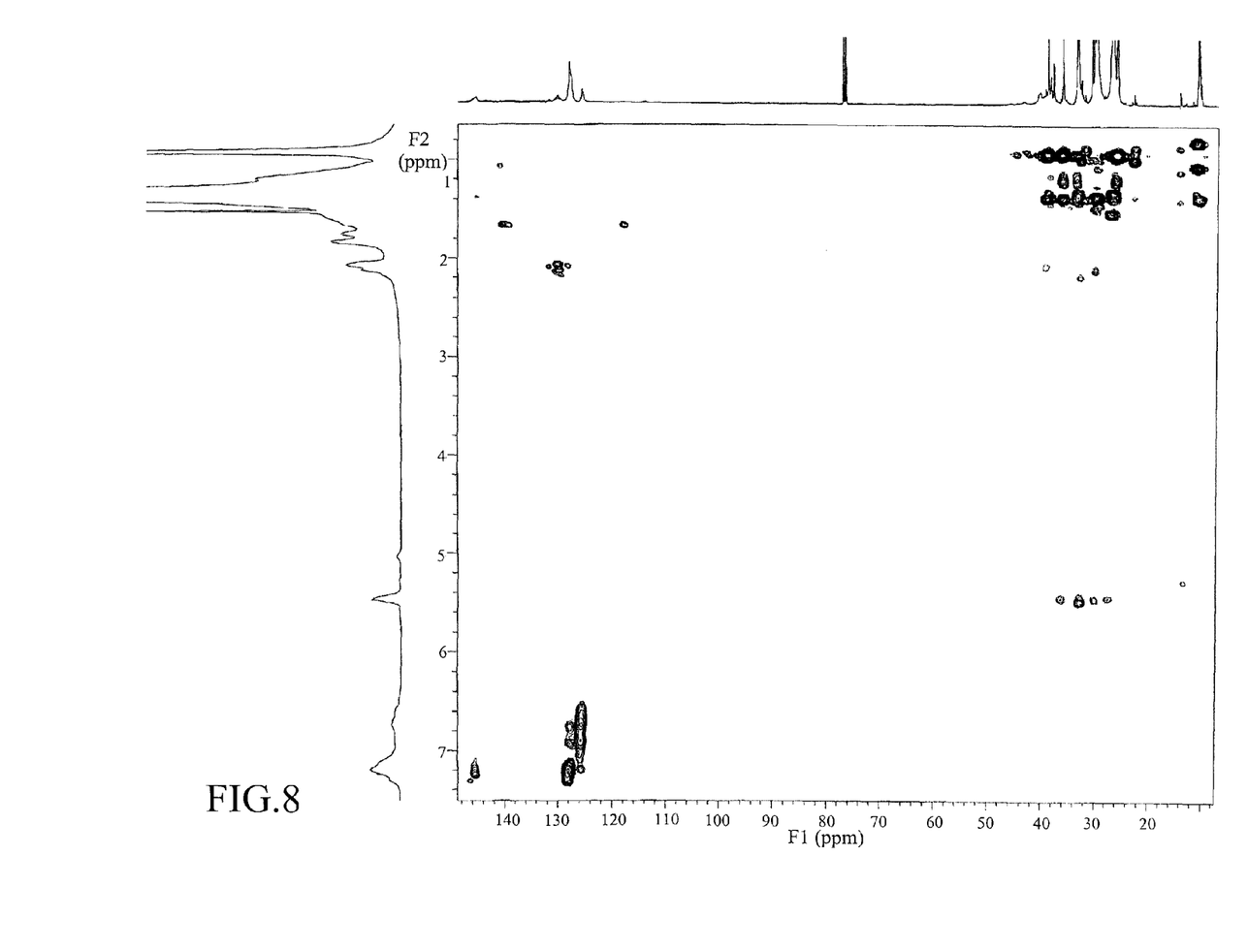
FIG. 8 shows the 2D H-MBC (Heteronuclear multiple bond coherence) spectrum of the hydrogenated tri-block copolymer in accordance with one embodiment of the present invention.

NMR analysis (Tri-Block SBS Copolymer): FIG. 8 shows the 2D H-MBC (Heteronuclear multiple bond coherence) spectrum of the hydrogenated tri-block copolymer.

Figure 9:
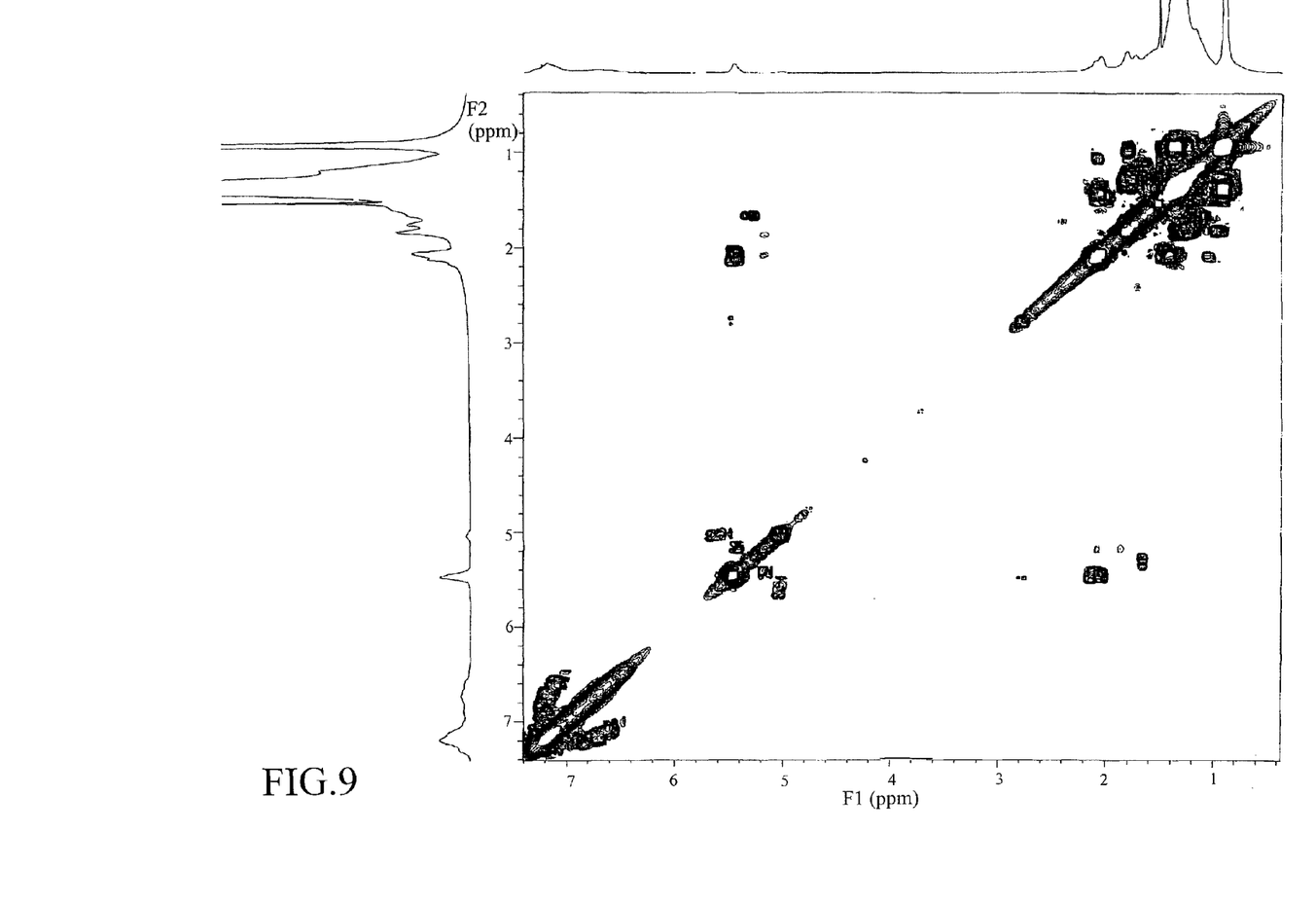
FIG. 9 shows the 2D COSY (Correlation spectroscopy) spectrum of the hydrogenated tri-block copolymer in accordance with one embodiment of the present invention.

NMR analysis (Tri-Block SBS Copolymer): FIG. 9 shows the 2D COSY (Correlation spectroscopy) spectrum of the hydrogenated tri-block copolymer.

Details for the embodiments 3-7 are omitted, as they are similar to the details of embodiments 1-2. Table I below shows the determinate results for the embodiments 1-7.

2.2 Add 3.5 g of $Ru/Al_2O_3$ catalyst ($Ru/Al_2O_3$: Ruthenium on $Al_2O_3$, having 10% of Ruthenium)

2.3 Purge with five times of Nitrogen gas and three times of Hydrogen gas 2.4 Build the pressure of Hydrogen gas to 60 kg/cm$^2$ 2.5 Heat the temperature and maintain at 170° C.

2.6 Keep the reaction for 160 mins.

Figure 6:
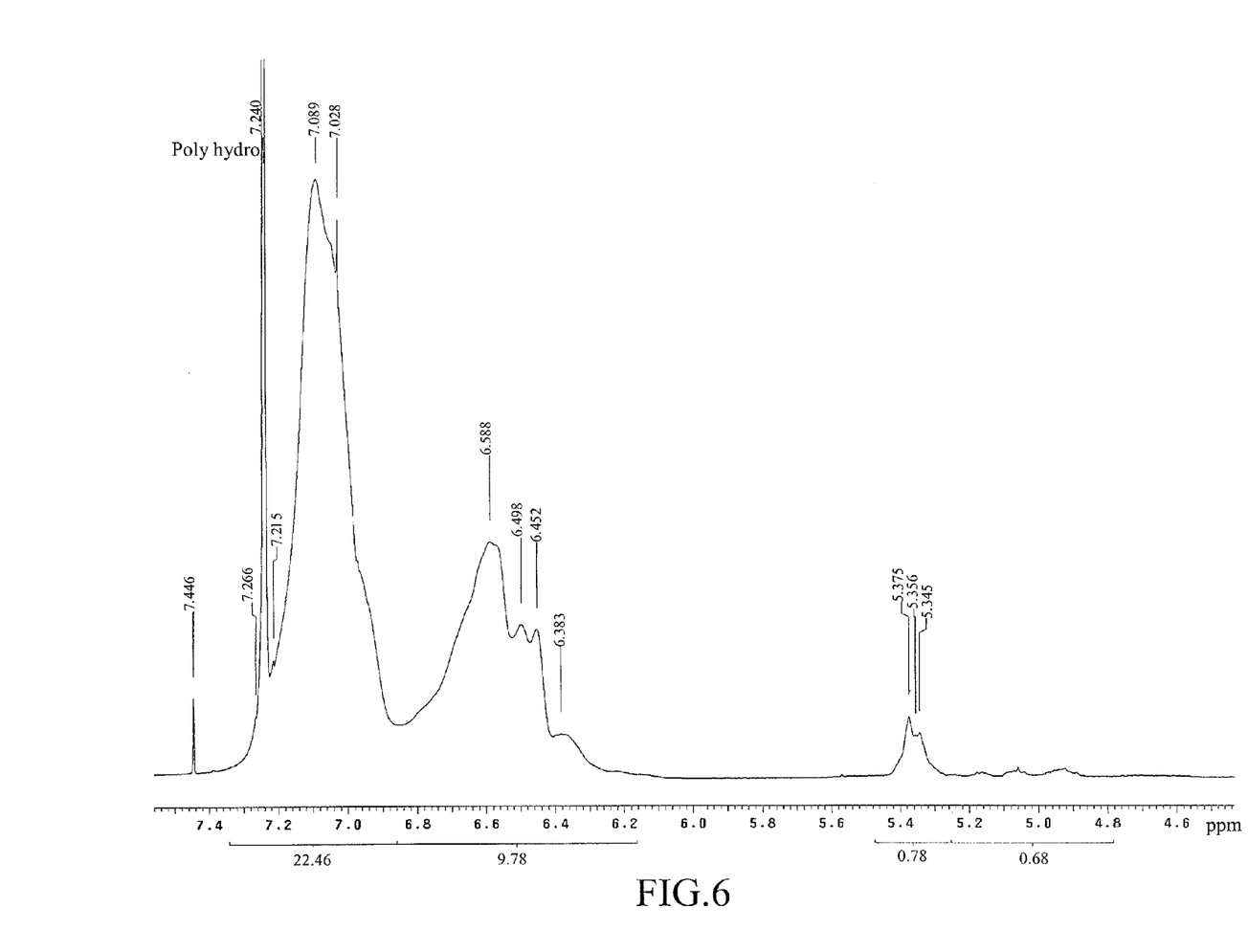
FIG. 6 shows the H-NMR spectrum of partial hydrogenated polystyrene in accordance with one embodiment of the present invention.

A H-NMR spectrum of partial hydrogenated polystyrene for Embodiment 8 is shown as FIG. 6. Details for the embodi-

| Ex. | Catalyst Composition | Pore Size in diameter (Å) | Polymer Type | Mw | $H_2$ Pressure (Kg/cm$^2$) | Reaction Time (min) | Hydrogenation level % | DB % |
|---|---|---|---|---|---|---|---|---|
| 1 | 10% Ru/Al$_2$O$_3$ | 300 | SBS | 22,000 | 60 | 200 | 45 | 17.2 |
| 2 | 10% Pd/Carbon | 40 | SBSBS | 65,000 | 38 | 240 | 30 | 3.1 |
| 3 | 10% Pd/Carbon | 40 | SBSBS | 65,000 | 38 | 90 | 20 | 2.6 |
| 4 | 10% Ru/Al$_2$O$_3$ | 300 | SBS | 22,000 | 60 | 300 | 70 | 9.6 |
| 5 | 10% Ru/Al$_2$O$_3$ | 300 | SBS | 22,000 | 60 | 420 | 85 | 2.5 |
| 6 | 10% Ru/Al$_2$O$_3$ | 300 | SBS | 100,000 | 60 | 350 | 70 | 7.9 |
| 7 | 10% Ru/TiO$_2$ | 256 | SBS | 54,000 | 60 | 300 | 55 | 13.0 |

Embodiments 8-13 show the preferred examples of making the second hydrogenated polymers.

Embodiment 8 of the Hydrogenated Polystyrene

A. Polymerization

The process of polymerization utilizes the cyclohexane as solvent with slight tetrahydrofuran (THF) as polar modifier and sec-butyllithium as polymerization initiator. Styrene is used as reaction monomers. The solvent, promoter and monomer can be purified by activated alumina. The reaction is performed in an autoclave with an agitator. The reaction process summarized as following steps:

1.1 Add 1100 g of cyclohexane and 1 g of THF 1.2 Heat the temperature to 45° C.

1.3 Add 150 g of styrene 1.4 Add 4.61 g of initiator to initiate the reaction 1.5 Keep the reaction for 30 mins 1.6 Add 0.2 g of methanol as terminator to terminate the reaction Thereafter, 1250 g of solution with polystyrene having a weight average molecular weight (Mw) of 15,400 may be obtained.

B. Partially Hydrogenation 2.1 Add 1100 ml of polystyrene solution in the autoclave (Total solid: 12%)

ments 9-13 are omitted, as they are similar to the details of embodiments 8. Table II as below shows the determinations of the results from embodiments 8-13. The DB % determination method for the hydrogenated polystyrene can be obtained in the same manner as aforementioned. Note for polystyrene, R (i.e. the amount ratio of the styrene monomer based on the total amount of the polymer prior to hydrogenation) is equal to 1.

| Ex. | Catalyst Composition | Pore Size in diameter (Å) | Polymer Type | Mw | $H_2$ Pressure (Kg/cm$^2$) | Reaction Time (min) | Hydrogenation level % | DB % |
|---|---|---|---|---|---|---|---|---|
| 8 | 10% Ru/Al$_2$O$_3$ | 300 | PS | 15,400 | 60 | 160 | 70 | 3.7 |
| 9 | Pd/Carbon | 40 | PS | 30,000 | 39 | 180 | 20 | 7.1 |
| 10 | 10% Ru/ZrO$_2$ | 197 | PS | 15,400 | 60 | 380 | 58 | 4.0 |
| 11 | 10% Ru/Al$_2$O$_3$ | 300 | PS | 15,400 | 60 | 300 | 65 | 8.1 |
| 12 | 10% Ru/TiO$_2$ | 256 | PS | 15,400 | 60 | 320 | 63 | 12.7 |
| 13 | 10% Ru/Al$_2$O$_3$ | 300 | PS | 23,200 | 50 | 250 | 30 | 2.2 |

The present invention also includes partial hydrogenation of star block copolymers made from the linear block copolymers as aforementioned. The star block copolymers may have poly nucleuses (i.e. polyalkenyl coupling agents) and polymeric arms linked to the nucleuses. The arms may include homopolymers or copolymers of conjugated dienes and vinyl aromatics. The star block copolymers can be prepared by forming the linear block polymers having active lithium atom on one end of the polymer chains; coupling the ends of the polymer chains with a multifunctional compound to add the polymer chain on to each functional group of the multifunctional compound.

Applications of the Hydrogenated Copolymer

Another aspect of the present invention is to provide a functionalized hydrogenated block copolymer by reacting the hydrogenated block copolymer with a functional group compound. Suitable functional group compounds include the acid anhydrides, acid halides, acid amides, sulfones, oxazolines, epoxies, isocyanates and amino group. For example, the functional group compound may have a carboxyl group and a group derived therefrom, such as a carboxyl group and a salt thereof, an ester group, an amide group and an acid anhydride group. The functionalization reaction may be performed in the presence of a radical initiator including such substances as peroxides and azo compounds. The functional group may be bound to a ring of the hydrogenated block copolymer. The functionalized hydrogenated block copolymer may be used as an improver for dispersibility of inorganic fillers, polarity, and reactivity and heat resistance in the thermoplastic resins.

Although specific preferred embodiments of the present invention have been described in the detailed description above, the description is not intended to limit the invention to the particular forms of embodiments disclosed therein, since they are to be recognized as illustrative rather than restrictive and it will be obvious to those skilled in the art that the invention is not so limited. Persons skilled in the art should understand that they could make various changes, substitutions and alterations herein without departing from the spirit and scope of the invention in its broadest form.

What is claimed is:

1. A hydrogenated polymer, comprising:
   at least one hydrogenated conjugated diene block having an average hydrogenation level of greater than 95 percent; and
   at least one hydrogenated vinyl aromatic block having a carbon ring linking with a backbone of the hydrogenated polymer, wherein:
      the average hydrogenation level for the hydrogenated vinyl aromatic block is between 20 percent and 80 percent;
      the average weight percent of the hydrogenated vinyl aromatic block(s) having only one and only two double bonds on the carbon ring is between 1-30 wt % based on the total weight of the hydrogenated polymer; and
      the hydrogenated polymer is a hydrogenated pentablock copolymer.

2. The hydrogenated polymer of claim 1, wherein the average hydrogenation level for the hydrogenated vinyl aromatic block is between 25 percent and 80 percent.

3. The hydrogenated polymer of claim 1, wherein the average weight percent of the hydrogenated vinyl aromatic block(s) having only one and two double bonds on the carbon ring is between 2-20 wt % based on the total weight of the hydrogenated polymer.

4. The hydrogenated polymer of claim 1, wherein the average hydrogenation level for the hydrogenated vinyl aromatic block is between 30 percent and 60 percent.

5. The hydrogenated polymer of claim 1, further characteristic in having a total weight average molecular weight ranged between 5,000 to 400,000.

6. The hydrogenated polymer of claim 1, wherein a monomer of the hydrogenated vinyl aromatic block is independently selected from the group consisting of styrene, all isomers of methylstyrene, all isomers of ethylstyrene, cyclohexylstyrene, vinyl biphenyl, 1-vinyl-5-hexyl naphthalene, vinyl naphthalene, vinyl anthracene, and any combination thereof; and a monomer of the hydrogenated conjugated diene block is independently selected from the group consisting of 1,3-butadiene, 2,3-dimethyl-1,3-butadiene, 3-butyl-1,3-octadiene, isoprene, 1-methylbutadiene, 2-phenyl-1,3-butadiene, and any combination thereof.

7. A method for partially hydrogenating polymer, comprising:
   providing a polymer having at least one vinyl aromatic block and at least one conjugated diene block; and
   hydrogenating the polymer in presence of a heterogeneous catalyst on a support selected from the group consisting of BaSO4, Al2O3, TiO2, ZrO2, active carbon and any combination thereof to obtain a hydrogenated polymer as claim 1.

8. The method of claim 7, wherein the heterogeneous catalyst comprises a metal selected from the group consisting of Palladium, Ruthenium, Nickel, and any combination thereof.

9. The method of claim 7, wherein the support only has pore sizes distributed less than 500 angstrom.

* * * * *